(12) United States Patent  (10) Patent No.: US 8,231,966 B2
Imai et al.  (45) Date of Patent: Jul. 31, 2012

(54) ANTI-REFLECTION COATING AND ITS PRODUCTION METHOD

(75) Inventors: Hiroaki Imai, Kanagawa (JP); Hiroyuki Nakayama, Tokyo (JP); Takanobu Shiokawa, Kanagawa (JP); Kazuhiro Yamada, Saitama (JP); Mineta Suzuki, Saitama (JP)

(73) Assignees: Keio University, Tokyo (JP); Pentax Ricoh Imaging Company, Ltd., Tokyo (JP)

( * ) Notice: Subject to any disclaimer, the term of this patent is extended or adjusted under 35 U.S.C. 154(b) by 385 days.

(21) Appl. No.: 12/393,333

(22) Filed: Feb. 26, 2009

(65) Prior Publication Data

US 2009/0220774 A1    Sep. 3, 2009

(30) Foreign Application Priority Data

Mar. 3, 2008 (JP) ................................. 2008-052607

(51) Int. Cl.
  *B32B 3/26* (2006.01)
  *B32B 9/00* (2006.01)
(52) U.S. Cl. .................. 428/304.4; 428/318.4
(58) Field of Classification Search ........... 428/304.4, 428/318.4
  See application file for complete search history.

(56) References Cited

U.S. PATENT DOCUMENTS

| | | | |
|---|---|---|---|
| 3,922,392 A * | 11/1975 | Kohlschutter et al. | 427/215 |
| 6,251,523 B1 * | 6/2001 | Takahashi et al. | 428/428 |
| 7,419,772 B2 * | 9/2008 | Watkins et al. | 430/325 |
| 2005/0109238 A1 * | 5/2005 | Yamaki et al. | 106/287.16 |
| 2006/0093786 A1 * | 5/2006 | Ohashi et al. | 428/131 |
| 2006/0154044 A1 | 7/2006 | Yamada et al. | |

FOREIGN PATENT DOCUMENTS

| | | |
|---|---|---|
| EP | 1 123 753 | 8/2007 |
| JP | 2005-510436 | 4/2005 |
| JP | 3668126 | 4/2005 |
| JP | 2006-130889 | 5/2006 |
| JP | 2006-215542 | 8/2006 |
| JP | 2009-040967 | 2/2009 |
| WO | 03/045840 | 6/2004 |

OTHER PUBLICATIONS

H. Imai, "Inorganic Polymers as Next Generation High Functionality Materials", Chemical Industry, 2005, vol. 56, No. 9, pp. 688-693.
K. Suzuki et al., "Synthesis of Silica Nanoparticles Having a Well-Ordered Mesostructure Using a Double Surfactant System", JACS, 2004, vol. 126, No. 2, pp. 462-463.

* cited by examiner

*Primary Examiner* — Victor Chang
(74) *Attorney, Agent, or Firm* — Greenblum & Bernstein, P.L.C.

(57) ABSTRACT

An anti-reflection coating comprising a mesoporous silica coating composed of mesoporous silica nano-particles formed on a substrate or a dense coating formed on the substrate, the mesoporous silica coating having a refractive index of more than 1.10 and 1.35 or less.

14 Claims, 6 Drawing Sheets

ANTI-REFLECTION COATING AND ITS PRODUCTION METHOD

FIELD OF THE INVENTION

The present invention relates to an anti-reflection coating formed on a substrate, particularly to an anti-reflection coating having a proper refractive index, and excellent anti-reflection performance to light rays in a wide wavelength range, as well as excellent scratch resistance, adhesion to a substrate, mechanical strength and moisture resistance, and its production method.

BACKGROUND OF THE INVENTION

Optical substrates, such as objective lenses in optical pickup apparatuses and semiconductor apparatuses, spectacle lenses, optical reflecting mirrors, lowpass filters, etc., are provided with anti-reflection coatings to improve light transmittance. The anti-reflection coatings have conventionally been formed by a physical method such as vacuum vapor deposition, sputtering, ion plating, etc. However, these film-forming methods are expensive because a vacuum equipment is needed.

A single-layer anti-reflection coating is designed to have a refractive index smaller than that of a substrate and larger than that of an incident medium such as air, etc. It is considered ideal for an anti-reflection coating formed on a glass lens having a refractive index of about 1.5 to have a refractive index of 1.2-1.25. However, there is no material having such an ideal refractive index, which can be formed into an anti-reflection coating by a physical method. Accordingly, $MgF_2$ having a refractive index of 1.38 is widely used for anti-reflection coatings.

Because optical equipments using light rays in a wide wavelength region have recently been put into practical use, anti-reflection coatings having excellent optical characteristics in a wide wavelength range have become desired. Because many optical members are constituted by pluralities of lenses, transmission loss by reflection on each lens surface should be suppressed as much as possible. For this purpose, multilayer anti-reflection coatings are generally used. A multilayer anti-reflection coating is designed such that light rays reflected at each interface and those entering each layer are canceled by interference. However, the multilayer anti-reflection coatings are disadvantageous in high cost.

Thus proposed is a method for forming an anti-reflection coating by a wet method (a dip-coating method, a roll-coating method, a spin-coating method, a flow-coating method, a spray-coating method, etc.) utilizing a sol-gel method comprising dehydration polycondensation.

For instance, JP 2006-215542 A proposes an anti-reflection coating comprising a dense coating and a porous silica aerogel layer formed in this order on a substrate, which has a refractive index decreasing from the substrate to the porous silica aerogel layer in this order. This porous silica aerogel layer is formed by (i) reacting a silicon oxide sol or gel with an organic-modifying agent to form an organically modified sol or gel, (ii) coating the organically modified sol or a sol formed from the organically modified gel onto a dense coating, the resultant organically modified silica gel layer being turned to an organically modified silica aerogel layer by a springback phenomenon, and (iii) heat-treating the organically modified silica aerogel layer to remove organic-modifying groups.

The porous silica aerogel layer has as small a refractive index as about 1.20, and an anti-reflection coating having such porous silica aerogel layer has excellent anti-reflection characteristics in a wide wavelength range. In addition, because the porous silica aerogel layer can be formed by a sol-gel method, it has excellent cost performance. However, the porous silica aerogel layer has small mechanical strength and adhesion to a substrate, and insufficient scratch resistance.

JP 2006-130889 A proposes a transparent, porous, inorganic coating free from cracking and peeling due to shrinkage occurring by a heat treatment despite its thickness of more than 1 μm, and having a small refractive index, and high transmittance of 90% or more in a region from visible light to near infrared light, which is a thin, mesoporous silica layer formed on a substrate and having nano-scale micropores. This thin, mesoporous silica layer is formed by coating a mixed solution comprising a surfactant, a silica-forming material such as tetraethoxysilane, water, an organic solvent, and acid or alkali onto a substrate to form an organic-inorganic composite coating, drying this coating, and photo-oxidizing it to remove organic components.

Japanese Patent 3668126 proposes a method for forming a ceramic layer having a low dielectric constant (high porosity and low refractive index), by preparing a liquid comprising a ceramic precursor such as tetraethoxysilane, a catalyst, a surfactant and a solvent, coating the liquid onto a substrate, and removing the solvent and the surfactant to form a porous silica layer.

However, the thin, mesoporous silica layer of JP 2006-130889 A and the porous silica layer of Japanese Patent 3668126 are insufficient in a balance of anti-reflection performance, a refractive index, scratch resistance, adhesion to a substrate, mechanical strength and moisture resistance. In addition, because the thin, mesoporous silica layer of JP 2006-130889 A and the porous silica layer of Japanese Patent 3668126 are obtained by forming a silicate network around a surfactant micelle during drying the coating, and proceeding the hydrolysis and polycondensation of the silicate to turn the network to a thin solid layer, they are non-uniform, with their production taking a long period of time for coating, hydrolysis and polycondensation.

"Chemical Industries," September, 2005, Vol. 56, No. 9, pp. 688-693, issued by Kagaku Kogyo-Sha, describes a coating of mesoporous silica nano-particles having high light transmittance, which is obtained by aging a mixture solution comprising tetraethoxysilane, a cationic surfactant (cetyltrimethyl ammonium chloride) and a nonionic surfactant represented by $[HO(C_2H_4O)_{106}—(C_3H_6O)_{70}—(C_2H_4O)_{106}H]$ under an acidic condition in the presence of hydrochloric acid; further aging it with ammonia water to prepare a solution of mesoporous silica nano-particles covered with the nonionic surfactant and containing the cationic surfactant in pores; coating this solution onto a substrate; drying the resultant coating; and baking it to remove the cationic surfactant and the nonionic surfactant. However, this reference fails to teach the use of such coating of mesoporous silica nano-particles as an anti-reflection coating.

OBJECT OF THE INVENTION

Accordingly, an object of the present invention is to provide an anti-reflection coating having a proper refractive index, and excellent anti-reflection performance to light rays in a wide wavelength range, as well as excellent scratch resistance, adhesion to a substrate, mechanical strength and moisture resistance, and a method for producing such an anti-reflection coating.

DISCLOSURE OF THE INVENTION

As a result of intensive research in view of the above object, the inventors have found that the formation of a mesoporous silica coating composed of mesoporous silica nano-particles, which are obtained by hydrolyzing an alkoxysilane solution containing a cationic surfactant and a nonionic surfactant at a predetermined molar ratio, and removing the cationic surfactant and the nonionic surfactant, on a substrate with or without a dense coating provides an anti-reflection coating having a proper refractive index, and excellent anti-reflection performance to light rays in a wide wavelength range, as well as excellent scratch resistance, adhesion to a substrate, mechanical strength and moisture resistance. The present invention has been completed based on such finding.

Thus, the first anti-reflection coating of the present invention comprises a mesoporous silica coating composed of mesoporous silica nano-particles formed on a substrate, the mesoporous silica coating having a refractive index of more than 1.10 and 1.35 or less.

The second anti-reflection coating of the present invention comprises a dense coating and a mesoporous silica coating formed in this order on a substrate, the mesoporous silica coating being composed of mesoporous silica nano-particles and having a refractive index of more than 1.10 and 1.35 or less.

The mesoporous silica nano-particles preferably have an average diameter of 200 nm or less. The mesoporous silica nano-particles preferably have a porous structure in which meso-pores are arranged hexagonally.

The mesoporous silica coating preferably has a structure in which a pore diameter distribution curve determined by a nitrogen adsorption method has two peaks. The pore diameter distribution curve of the mesoporous silica coating preferably has a peak due to the diameters of pores in particles in a range of 2-10 nm, and a peak due to the diameters of pores among particles in a range of 5-200 nm. A volume ratio of pores in the particles to pores among the particles is preferably 1/2-1/1. The mesoporous silica coating preferably has a refractive index of more than 1.10 and 1.35 or less. The mesoporous silica coating preferably has a physical thickness of 15-500 nm.

In a preferred example of the second anti-reflection coatings, the dense coating is a single-layer, and a refractive index decreases from the substrate to the mesoporous silica coating in this order. In another preferred example of the second anti-reflection coatings, the dense coating is a multilayer comprising pluralities of layers having different refractive indices.

The first method of the present invention for producing an anti-reflection coating comprising a mesoporous silica coating composed of mesoporous silica nano-particles on a substrate, comprises the steps of (i) aging a mixture solution comprising a solvent, an acid catalyst, alkoxysilane, a cationic surfactant and a nonionic surfactant, a molar ratio of the nonionic surfactant to the alkoxysilane being $3.5 \times 10^{-3}$ or more and less than $2.5 \times 10^{-2}$, thereby causing the hydrolysis and polycondensation of the alkoxysilane; (ii) adding a base catalyst to an acidic sol containing the resultant silicate, to prepare a solution of mesoporous silica nano-particles covered with the nonionic surfactant and containing the cationic surfactant in pores; (iii) applying the solution to the substrate; (iv) drying the resultant coating to remove the solvent; and (v) baking the coating to remove the cationic surfactant and the nonionic surfactant.

The second method of the present invention for producing an anti-reflection coating comprising a dense, single-layer or multilayer coating and a mesoporous silica coating composed of mesoporous silica nano-particles on a substrate, comprises the steps of (1) forming a dense, single-layer or multilayer coating made of an inorganic material on the substrate by a vapor deposition method; (2) (i) aging a mixture solution comprising a solvent, an acid catalyst, alkoxysilane, a cationic surfactant and a nonionic surfactant, a molar ratio of the nonionic surfactant to the alkoxysilane being $3.5 \times 10^{-3}$ or more and less than $2.5 \times 10^{-2}$, thereby causing the hydrolysis and polycondensation of the alkoxysilane; (ii) adding a base catalyst to an acidic sol containing the resultant silicate, to prepare a solution of mesoporous silica nano-particles covered with the nonionic surfactant and containing the cationic surfactant in pores; (iii) applying the solution to the dense, single-layer or multilayer coating; (iv) drying the resultant coating to remove the solvent; and (v) baking the coating to remove the cationic surfactant and the nonionic surfactant.

The cationic surfactant is preferably n-hexadecyltrimethyl ammonium chloride, and the nonionic surfactant is preferably a block copolymer represented by the formula of $RO(C_2H_4O)_a-(C_3H_6O)_b-(C_2H_4O)_cR$, wherein a and c are respectively 10-120, b is 30-80, and R is a hydrogen atom or an alkyl group having 1-12 carbon atoms. A molar ratio of the cationic surfactant to the nonionic surfactant is preferably more than 8 and 60 or less.

The acid catalyst is preferably hydrochloric acid. The base catalyst is preferably ammonia. The alkoxysilane is preferably tetraethoxysilane. The base catalyst is preferably added to adjust the pH of a solution of the mesoporous silica nano-particles to 9-12. The baking is preferably conducted at a temperature higher than 500° C.

DESCRIPTION OF THE PREFERRED EMBODIMENTS

[1] Optical Element having Anti-Reflection Coating

The anti-reflection coating is formed on an optical substrate (simply called "substrate"). The first anti-reflection coating is constituted by a mesoporous silica coating, and the second anti-reflection coating is constituted by a dense coating and a mesoporous silica coating in this order from the substrate.

(1) Optical Member Having First Anti-Reflection Coating

Figure 1:
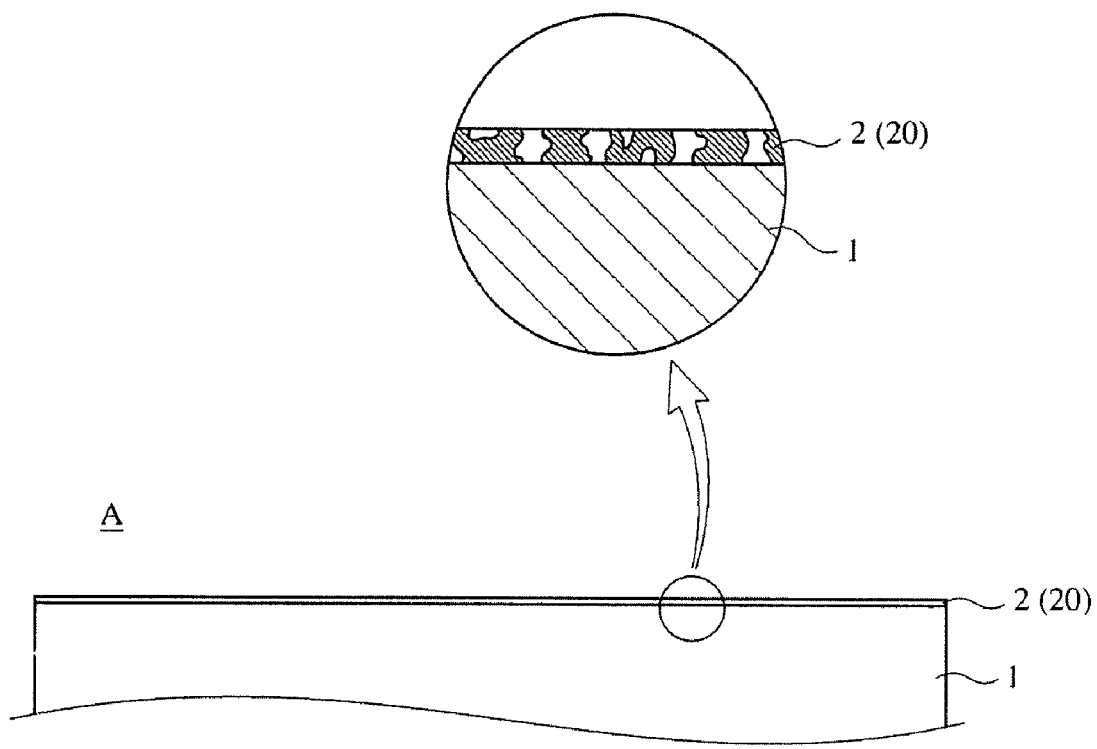
FIG. 1 is a cross-sectional view showing one example of optical members, which has the anti-reflection coating of the present invention.

FIG. 1 shows a first anti-reflection coating 2 formed on the substrate 1. The first anti-reflection coating 2 is constituted by a mesoporous silica coating 20. Although the substrate 1 is a flat plate in the example shown in FIG. 1, the present invention is not restricted thereto, but the substrate 1 may be a lens, a prism, a light guide, a diffraction grating, etc. The substrate 1 may be made of glass, crystalline materials or plastics. Specific examples of materials for the substrate 1 include optical glass such as BK7, LASF01, LASF016, LAK14, SF5, etc., Pyrex (registered trademark) glass, quartz, soda lime glass, white crown glass, etc. These materials for the substrate 1 have refractive indices in a range of 1.45-1.85.

Figure 2:
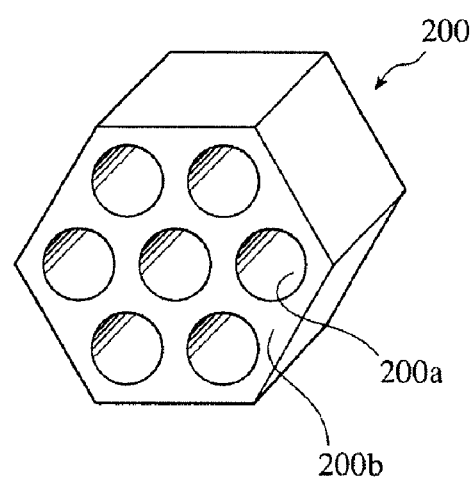
FIG. 2 is a perspective view showing one example of mesoporous silica particles forming the anti-reflection coating of FIG. 1.

The mesoporous silica coating 20 is composed of mesoporous silica nano-particles, which are deposited on the substrate 1. FIG. 2 shows one example of the mesoporous silica nano-particles. This particle 200 is constituted by a silica skeleton 200b having a porous structure in which meso-pores 200a are hexagonally arranged. However, the mesoporous silica nano-particles 200 are not restricted to a hexagonal structure, but may have a cubic structure or a ramera structure. The mesoporous silica coating 20 need only comprise one or more types of these particles, though the particles 200 having a hexagonal structure are preferable. Because the mesoporous silica nano-particles 200 uniformly have meso-pores 200a hexagonally arranged, the mesoporous silica coating 20 has excellent transparency, mechanical strength and cracking resistance.

The average diameter of the mesoporous silica nano-particles 200 is preferably 200 nm or less, more preferably 20-50 nm. When this an average diameter is more than 200 nm, it is difficult to adjust the thickness of the mesoporous silica coating 20, resulting in low flexibility in designing a thin layer, and providing the mesoporous silica coating 20 with low anti-reflection characteristics and cracking resistance. The average diameter of the mesoporous silica nano-particles 200 is measured by a dynamic light-scattering method. The refractive index of the mesoporous silica coating 20 depends on its porosity; larger porosity provides a smaller refractive index. The mesoporous silica coating 20 preferably has porosity of 25% or more and less than 75%. The refractive index of the mesoporous silica coating 20 having porosity of 25% or more and less than 75% is more than 1.10 and 1.35 or less, preferably 1.15-1.30. When the porosity is more than 75%, the mesoporous silica coating 20 has too small scratch resistance, mechanical strength and cracking resistance. When the porosity is less than 25%, the mesoporous silica coating 20 has too large a refractive index. This porosity is more preferably 35-65%.

Figure 3:
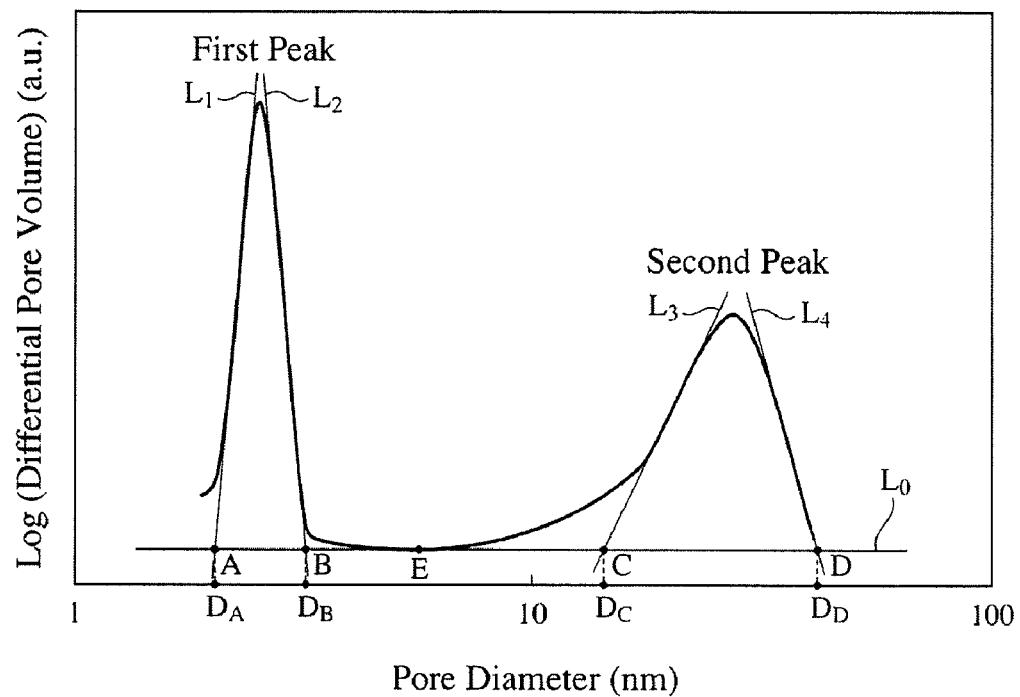
FIG. 3 is a graph showing a typical pore diameter distribution curve.

As shown in FIG. 3, the pore diameter distribution curve of the mesoporous silica coating 20 determined by a nitrogen adsorption method preferably has two peaks. Specifically, the pore diameter distribution curve determined from the isothermal nitrogen desorption curve of the mesoporous silica coating 20 by analysis by a BJH method, in which the axis of abscissas represents a pore diameter, and the axis of ordinates represents log (differential pore volume), preferably has two peaks. The BJH method is described, for instance, in "Method for Determining Distribution of Meso-Pores," E. P. Barrett, L. G Joyner, and P. P. Halenda, J. Am. Chem. Soc., 73, 373 (1951). Log (differential pore volume) is expressed by dV/d (log D), in which dV represents small pore volume increment, and d (log D) represents the small increment of log (pore diameter D). A first peak on the smaller pore diameter side is attributed to the diameters of pores in particles, and a second peak on the larger pore diameter side is attributed to the diameters of pores among particles. The mesoporous silica coating 20 preferably has a pore diameter distribution, in which the diameters of pores in particles are in a range of 2-10 nm, and the diameters of pores among particles are in a range of 5-200 nm. The mesoporous silica coating 20 having the diameters of pores in and among particles in the above ranges has a proper refractive index of more than 1.10 and 1.35 or less, and excellent anti-reflection performance, scratch resistance, adhesion to a substrate, mechanical strength and moisture resistance.

A ratio of the total volume $V_1$ of pores in particles to the total volume $V_2$ of pores among particles is preferably 1/2-1/1. The mesoporous silica coating 20 having this ratio within the above range has an excellent balance of anti-reflection performance and cracking resistance. This ratio is more preferably 1/1.9-1/1.2. The total volumes $V_1$ and $V_2$ are determined by the following method. In FIG. 3, a straight line passing a point E of the minimum value in the ordinate between the first and second peaks and in parallel with the axis of abscissas is used as a baseline $L_0$, and values $D_A$-$D_D$ in the abscissas are determined from each intersection A-D between the maximum inclination line (tangent line at the maximum inclination point) $L_1$-$L_4$ of each peak and the baseline $L_0$. By analysis by a BJH method, the total volume $V_1$ of pores in a diameter range from $D_A$ to $D_B$, and the total volume $V_2$ of pores in a diameter range from $D_C$ to $D_D$ are calculated.

The physical thickness of the mesoporous silica coating 20 is preferably 15-500 nm, more preferably 100-150 nm.

(2) Optical Member having Second Anti-Reflection Coating

Figure 4:
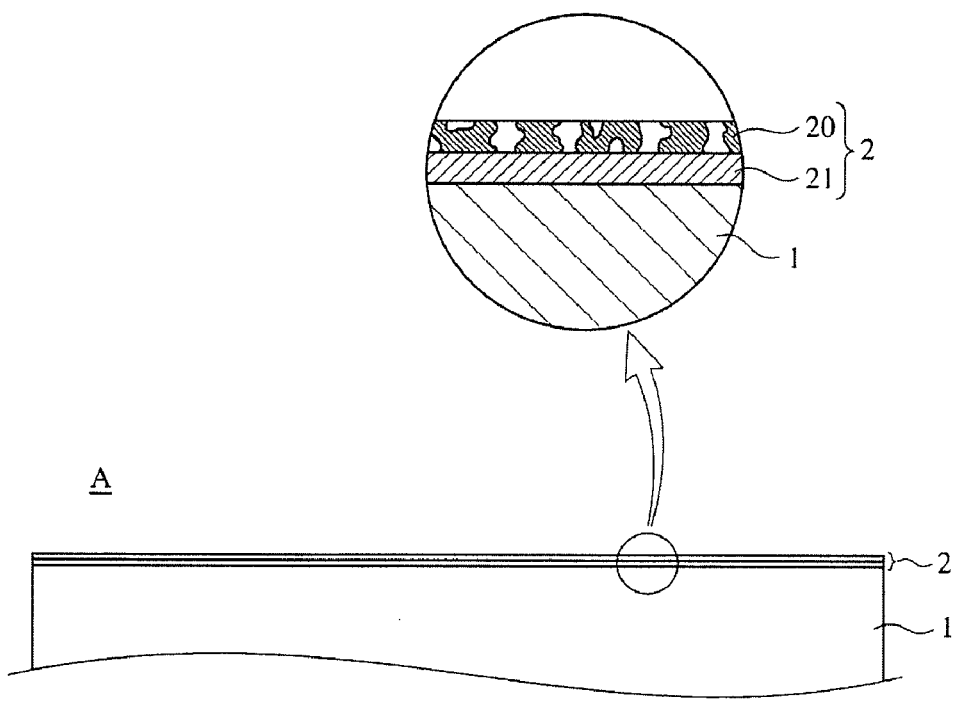
FIG. 4 is a cross-sectional view showing another example of optical members, which has the anti-reflection coating of the present invention.

FIG. 4 shows one example of the second anti-reflection coatings. The second anti-reflection coating 2 comprises a dense coating 21 and a mesoporous silica coating 20 in this order from the substrate 1. The mesoporous silica coating 20 may be the same as above.

A refractive index preferably decreases from the substrate 1, to the dense coating 21, to the mesoporous silica coating 20 and to the incident medium A in this order. The optical thickness $d_1$ and $d_2$ of the dense coating 21 and the mesoporous silica coating 20 are preferably in a range of λd/5 to λd/3, wherein λd is a designed wavelength. The optical thickness of a layer is a product of the refractive index and physical thickness of the layer. The designed wavelength λd used for determining the structure of a coating can be properly determined depending on wavelength used for an optical member, but it is preferably substantially a center wavelength, for instance, of a visible wavelength range of 380-780 nm according to CIE (Commission Internationale de l'Eclairage).

Figure 5:
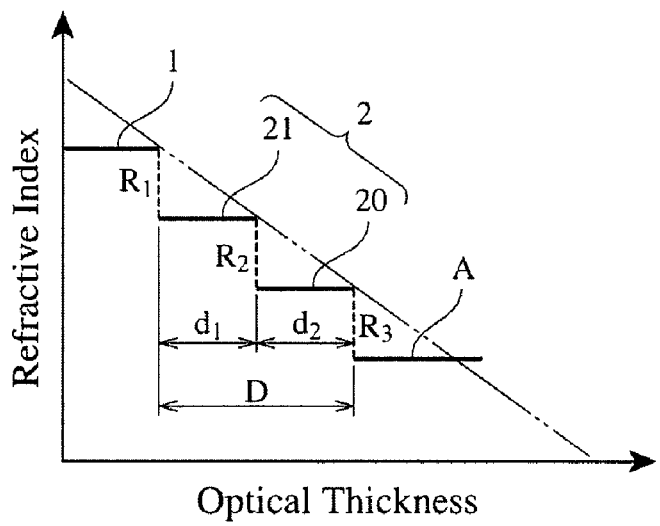
FIG. 5 is a graph showing the relation between optical thickness and a refractive index in the anti-reflection coating on the optical member of FIG. 4.

In the anti-reflection coating 2 comprising a dense coating 21 and a mesoporous silica coating 20 having a refractive index decreasing stepwise from the substrate 1, in which the optical thickness of each layer 21, 20 is in a range of λd/5 to λd/3, wherein λd is a designed wavelength, the optical thickness D (sum of the optical thicknesses $d_1$ and $d_2$) of the anti-reflection coating 2 is in a range of 2λd/5 to 2λd/3, and the refractive index changes smoothly and stepwise relative to the optical thickness from the substrate 1 to the incident medium A as shown in FIG. 5. When the optical thickness D of the anti-reflection coating 2 is in a range of $2\lambda d/5$ to $2\lambda d/3$, the light path difference between light rays reflected by a surface of the anti-reflection coating 2 and light rays reflected by an interface between the anti-reflection coating 2 and the substrate 1 is substantially ½ of the designed wavelength $\lambda d$, so that these light rays are canceled by interference. With smooth and stepwise change of the refractive index relative to the optical thickness from the substrate 1 to the incident medium A, the reflection of incident light at each interface can be reduced in a wide wavelength range. Further, light rays reflected at each interface are canceled by light rays entering each layer by interference. Accordingly, the anti-reflection coating 2 has excellent anti-reflection performance to light rays in wide wavelength and incident angle ranges. If the optical thickness of each layer 20, 21 were not in a range of $\lambda d/5$ to $\lambda d/3$, there would be no smooth change of a refractive index relative to the optical thickness from the substrate 1 to the incident medium A, resulting in large reflectance at the interface of the layers 20 and 21. Each optical thickness $d_1$, $d_2$ of the dense coating 21 and the mesoporous silica coating 20 is more preferably $\lambda d/4.5$ to $\lambda d/3.5$.

The refractive index differences $R_1$, $R_2$, $R_3$ between the substrate 1 and the dense coating 21, between the dense coating 21 and the mesoporous silica coating 20, and between the mesoporous silica coating 20 and the incident medium A are preferably 0.02-0.4, such that the change of the refractive index to the optical thickness is so smooth that it can be approximated substantially by a straight line. Thus, the anti-reflection coating 2 has an improved anti-reflection effect.

The dense coating 21 is a layer made of inorganic materials such as metal oxides, etc. (called "inorganic layer"). Materials for the dense coating 21 are selected from those having refractive indices smaller than the refractive index of the substrate 1 and larger than the refractive index (more than 1.10 and 1.35 or less) of the mesoporous silica coating 20.

Specific examples of the inorganic materials usable for the inorganic layer include magnesium fluoride, calcium fluoride, aluminum fluoride, lithium fluoride, sodium fluoride, cerium fluoride, silicon oxide, aluminum oxide, cryolite, chiolite, and these mixtures.

Figure 6:
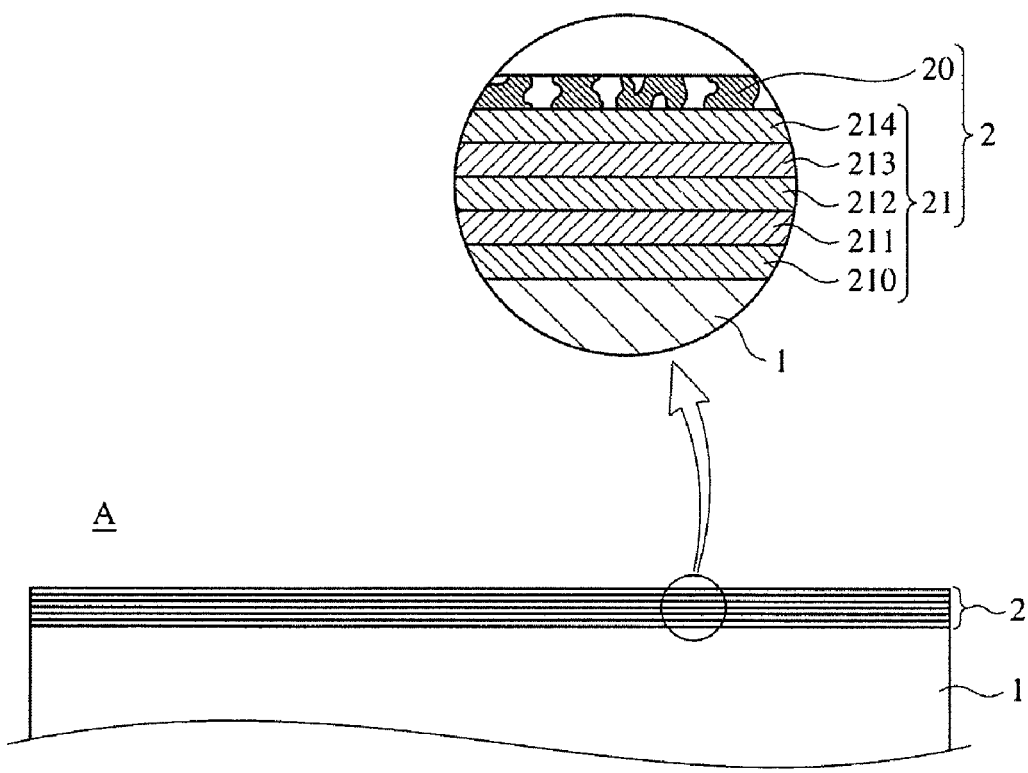
FIG. 6 is a cross-sectional view showing a further example of optical members, which has the anti-reflection coating of the present invention.
Figure 7:
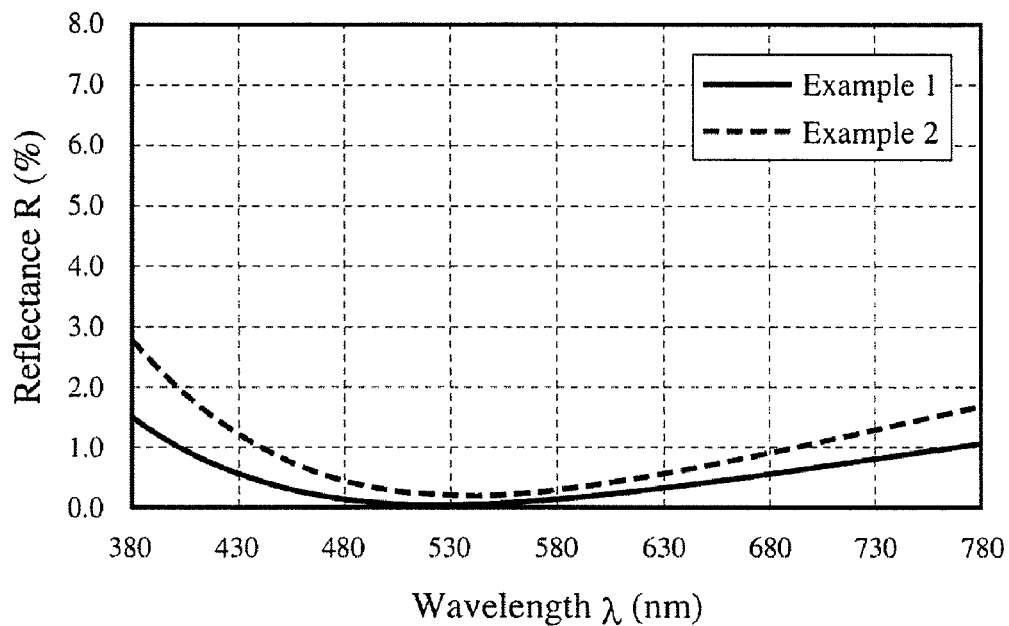
FIG. 7 is a graph showing the spectral reflectance of the anti-reflection coatings of Examples 1 and 2.
Figure 8:
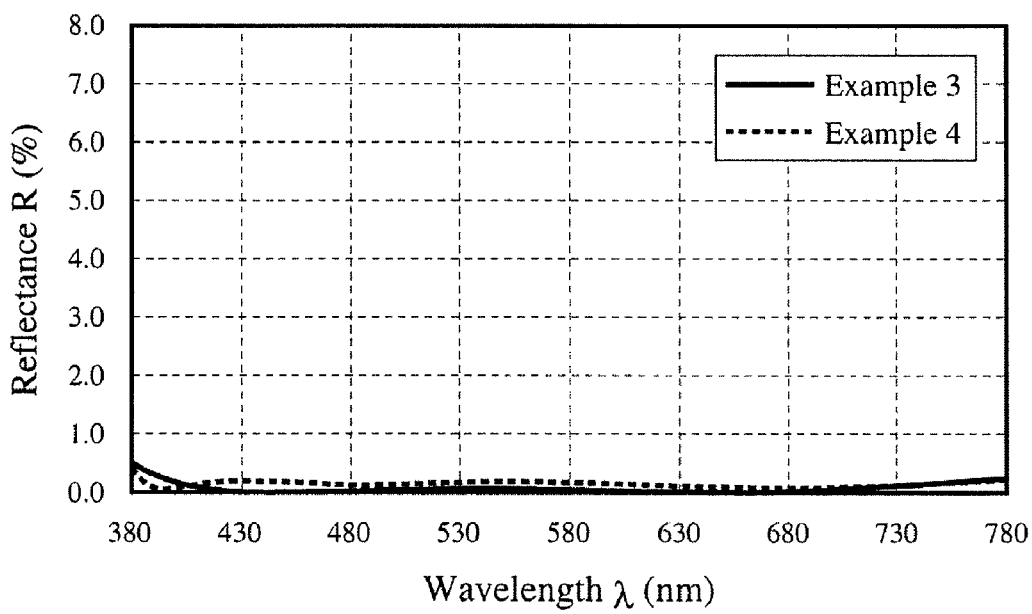
FIG. 8 is a graph showing the spectral reflectance of the anti-reflection coatings of Examples 3 and 4.
Figure 9:
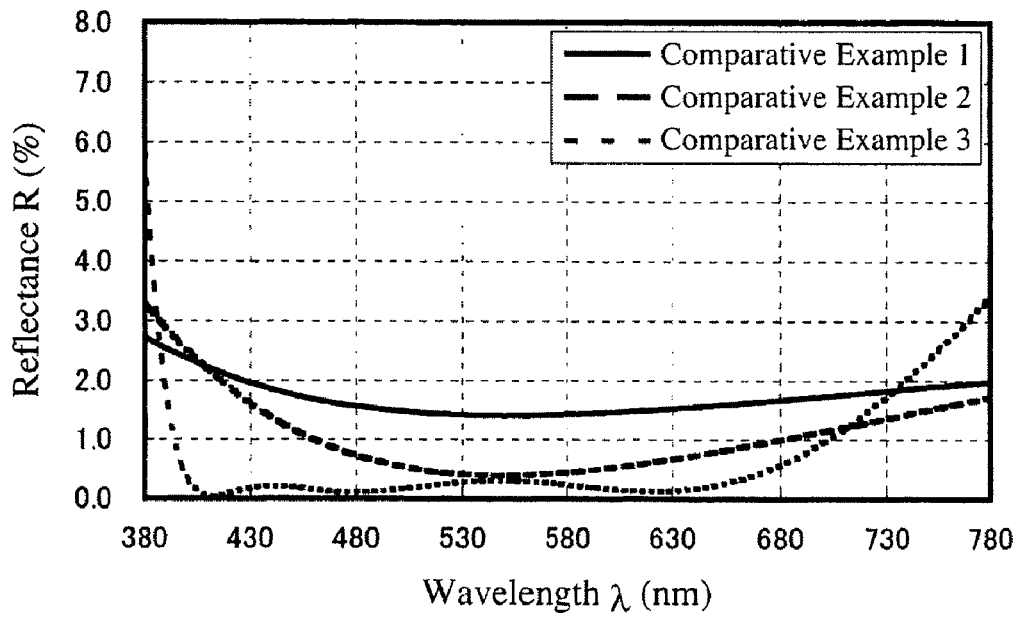
FIG. 9 is a graph showing the spectral reflectance of the anti-reflection coatings of Comparative Examples 1-3.
Figure 10:
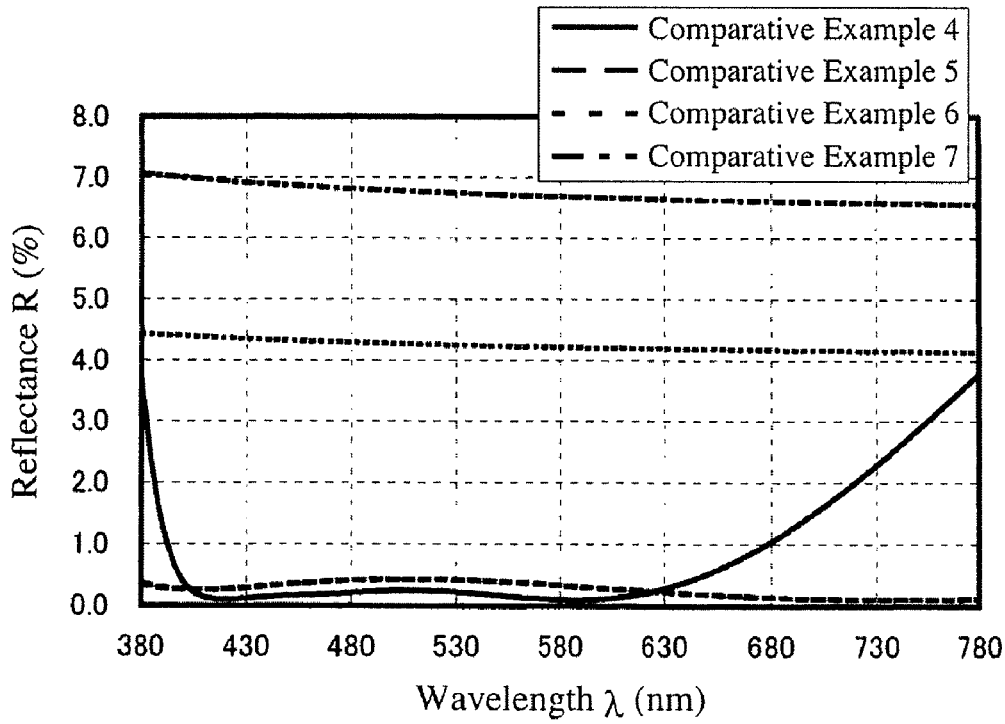
FIG. 10 is a graph showing the spectral reflectance of the multilayer anti-reflection coatings of Comparative Examples 4 and 5, and the spectral reflectance of the flat glass plates of Comparative Examples 6 and 7.

The dense coating 21 in the second anti-reflection coating 2 may be multilayer. FIG. 6 shows one example of the second anti-reflection coatings comprising a dense, multilayer coating 21. This anti-reflection coating 2 is the same as the two-layer anti-reflection coating 2 shown in FIG. 4, except that the dense coating 21 has a five-layer structure comprising a first layer 210 to a fifth layer 214. However, the dense, multilayer coating 21 is not restricted to the five-layer structure. The dense, multilayer coating 21 is preferably designed such that light rays reflected at each interface are canceled by light rays entering each layer by interference. Specifically, anti-reflection efficiency can be increased by properly combining pluralities of layers having different refractive indices. Materials for the dense, multilayer coating 21 may be, for instance, $SiO_2$, $TiO_2$, $Al_2O_3$, $MgF_2$, SiN, $CeO_2$, $ZrO_2$, $HfO_2$, $Ta_2O_5$, etc. Specific examples of the dense, multilayer coating 21 include a 4-to-6-layer alternate coating of $TiO_2$ and $MgF_2$, a 4-to-6-layer alternate coating of $TiO_2$ and $SiO_2$, etc., which are formed by vacuum vapor deposition.

[2] Formation Method of Anti-Reflection Coating (1) Formation of Mesoporous Silica Coating The mesoporous silica coating can be formed by (i) aging a mixture solution comprising a solvent, an acid catalyst, alkoxysilane, a cationic surfactant and a nonionic surfactant to cause the hydrolysis and polycondensation of the alkoxysilane, (ii) adding a base catalyst to an acidic sol containing the resultant silicate, to prepare a solution (sol) of mesoporous silica nano-particles covered with the nonionic surfactant and containing the cationic surfactant in pores, which may be called "surfactant-mesoporous silica nano-particles composite" below, (iii) applying the sol to the substrate or a dense coating surface, (iv) drying the resultant coating to remove the solvent, and (v) baking the coating to remove the cationic surfactant and the nonionic surfactant.

(a) Starting Materials (a-1) Alkoxysilane

The alkoxysilane may be a monomer or an oligomer. The alkoxysilane monomer preferably has 3 or more alkoxy groups. The use of the alkoxysilane having 3 or more alkoxy groups as a starting material provides a mesoporous silica coating with excellent uniformity. Specific examples of the alkoxysilane monomers include methyltrimethoxysilane, methyltriethoxysilane, phenyltriethoxysilane, tetramethoxysilane, tetraethoxysilane, tetrapropoxysilane, tetrabutoxysilane, diethoxydimethoxysilane, dimethyldimethoxysilane, dimethyldiethoxysilane, etc. The alkoxysilane oligomers are preferably polycondensates of these monomers. The alkoxysilane oligomers can be obtained by the hydrolysis and polycondensation of the alkoxysilane monomers. Specific examples of the alkoxysilane oligomers include silsesquioxane represented by the general formula: $RSiO_{1.5}$, wherein R represents an organic functional group.

(a-2) Surfactants (i) Cationic Surfactants

Specific examples of the cationic surfactants include alkyl trimethyl ammonium halides, alkyl triethyl ammonium halides, dialkyl dimethyl ammonium halides, alkyl methyl ammonium halides, alkoxy trimethyl ammonium halides, etc. The alkyl trimethyl ammonium halides include lauryl trimethyl ammonium chloride, cetyl trimethyl ammonium chloride, cetyl trimethyl ammonium bromide, stearyl trimethyl ammonium chloride, benzyl trimethyl ammonium chloride, behenyl trimethyl ammonium chloride, etc. The alkyl trimethyl ammonium halides include n-hexadecyl trimethyl ammonium chloride, etc. The dialkyl dimethyl ammonium halides include distearyl dimethyl ammonium chloride, stearyl dimethylbenzyl ammonium chloride, etc. The alkyl methyl ammonium halides include dodecyl methyl ammonium chloride, cetyl methyl ammonium chloride, stearyl methyl ammonium chloride, benzyl methyl ammonium chloride, etc. The alkoxy trimethyl ammonium halides include octadesiloxypropyl trimethyl ammonium chloride, etc.

(ii) Nonionic Surfactants

The nonionic surfactants include block copolymers of ethylene oxide and propylene oxide, polyoxyethylene alkylethers, etc. The block copolymers of ethylene oxide and propylene oxide include, for instance, those represented by the formula of $RO(C_2H_4O)_a-(C_3H_6O)_b-(C_2H_4O)_cR$, wherein a and c are respectively 10-120, b is 30-80, and R is a hydrogen atom or an alkyl group having 1-12 carbon atoms. The block copolymers are commercially available as, for instance, Pluronic (registered trademark of BASF). The polyoxyethylene alkyl ethers include polyoxyethylene lauryl ether, polyoxyethylene cetyl ether, polyoxyethylene stearyl ether, etc.

(a-3) Catalysts (i) Acid Catalysts

Specific examples of the acid catalysts include inorganic acids such as hydrochloric acid, sulfuric acid, nitric acid, etc. and organic acids such as formic acid, acetic acid, etc.

(ii) Base Catalysts

Specific examples of the base catalysts include ammonia, amine, NaOH and KOH. The preferred examples of the amines include alcohol amines and alkyl amines (methylamine, dimethylamine, trimethylamine, n-butylamine, n-propylamine, etc.).

(a-4) Solvents

The solvent is preferably pure water.

(b) Formation Method (b-1) Hydrolysis and Polycondensation Under Acidic Conditions An acid catalyst is added to pure water to prepare an acidic solution, to which a cationic surfactant and a nonionic surfactant are added to prepare a mixed solution. Alkoxysilane is added to the mixed solution to cause hydrolysis and polycondensation. The acidic solution preferably has pH of about 2. Because a silanol group of alkoxysilane has an isoelectric point of about pH 2, the silanol group is stable in the acidic solution of about pH 2. A solvent/alkoxysilane molar ratio is preferably 30-300. When this molar ratio is less than 30, the degree of polymerization of alkoxysilane is too high. When it is more than 300, the degree of polymerization of alkoxysilane is too low.

A cationic surfactant/solvent molar ratio is preferably $1\times10^{-4}$ to $3\times10^{-3}$, to provide mesoporous silica nano-particles with excellent regularity of meso-pores. This molar ratio is more preferably $1.5\times10^{-4}$ to $2\times10^{-3}$.

A cationic surfactant/alkoxysilane molar ratio is preferably $1\times10^{-1}$ to $3\times10^{-1}$. When this molar ratio is less than $1\times10^{-1}$, the formation of the meso-structure of mesoporous silica nano-particles is insufficient. When it is more than $3\times10^{-1}$, the mesoporous silica nano-particles have too large diameters. This molar ratio is more preferably $1.5\times10^{-1}$ to $2.5\times10^{-1}$.

A nonionic surfactant/alkoxysilane molar ratio is $3.5\times10^{-3}$ or more and less than $2.5\times10^{-2}$. When this molar ratio is less than $3.5\times10^{-3}$, the mesoporous silica coating has too large refractive index. When it is $2.5\times10^{-2}$ or more, the mesoporous silica coating has a refractive index of 1.10 or less.

A cationic surfactant/nonionic surfactant molar ratio is preferably more than 8 and 60 or less to provide mesoporous silica nano-particles with excellent regularity of meso-pores. This molar ratio is more preferably 10-50.

The alkoxysilane-containing solution is aged for about 1-24 hours. Specifically, the solution is left to stand or slowly stirred at 20-25° C. The hydrolysis and polycondensation proceed by aging, to form an acidic sol containing a silicate (oligomer derived from alkoxysilane).

(b-2) Hydrolysis and Polycondensation Under Basic Conditions

A base catalyst is added to the acidic sol to turn the solution basic, thereby completing the hydrolysis and polycondensation reaction to obtain mesoporous silica nano-particles having an average diameter of 200 nm or less. The pH of the solution is preferably adjusted to 9-12.

A silicate skeleton is formed around a cationic surfactant micelle by the addition of the base catalyst, and grows with regular hexagonal arrangement, thereby forming composite particles of silica and the cationic surfactant. As the composite particles grow, effective charge on their surfaces decreases, so that the nonionic surfactant is adsorbed to their surfaces, resulting in a solution (sol) of mesoporous silica nano-particles covered with the nonionic surfactant and containing the cationic surfactant in pores, whose shape is shown in FIG. 2. See, for instance, Hiroaki Imai, "Chemical Industries," September, 2005, Vol. 56, No. 9, pp. 688-693, issued by Kagaku Kogyo-Sha. In the process of forming the mesoporous silica nano-particles, the growth of the composite particles is suppressed by the adsorption of the nonionic surfactant. Accordingly, mesoporous silica nano-particles obtained by the above method using two types of surfactants have an average diameter of 200 nm or less and excellent regularity of meso-pores.

(b-3) Coating

A solution (sol) of a surfactant-mesoporous silica nano-particles composite is coated onto a substrate. The sol may be coated by a spin-coating method, a dip-coating method, a spray-coating method, a flow-coating method, a bar-coating method, a reverse-coating method, a flexographic printing method, a printing method, or their combination. The thickness of the resultant porous coating can be controlled, for instance, by the adjustment of a substrate-rotating speed in the spin-coating method, by the adjustment of pulling-up speed in the dipping method, or by the adjustment of a concentration in the coating solution. The substrate-rotating speed in the spin-coating method is preferably about 500 rpm to about 10,000 rpm.

To provide the sol with proper concentration and fluidity, a basic aqueous solution having the same pH as that of the sol may be added as a dispersing medium before coating. The percentage of the surfactant-mesoporous silica nano-particles composite in the coating solution is preferably 10-50% by mass. Outside this range, a uniform, thin coating cannot be formed easily.

(b-4) Drying

The solvent is evaporated from the coated sol. The drying conditions of the coating are not restricted, but may be properly selected depending on the heat resistance of the substrate, etc. The coating may be spontaneously dried, or heat-treated at a temperature of 50-200° C. for 15 minutes to 1 hour for accelerated drying.

(b-5) Sintering

The dried coating is baked to remove the cationic surfactant and the nonionic surfactant, thereby forming a mesoporous silica coating. The baking temperature is higher than 500° C., preferably 550° C. or higher. When the baking temperature is 500° C. or lower, the resultant coating has a low refractive index with reduced mechanical strength. The upper limit of the baking temperature is preferably the glass transition temperature of the substrate, more preferably the glass transition temperature of the substrate −50° C. When the baking temperature is higher than the glass transition temperature of the substrate, the substrate is deformed. The baking time is preferably 1-6 hours, more preferably 2-4 hours. Because bonding between the mesoporous silica particles themselves and between the mesoporous silica particles and the substrate is strengthened by baking, the coating has improved scratch resistance, adhesion to a substrate, and mechanical strength.

(2) Formation of Dense Coating

The inorganic layer or layers can be formed by physical vapor deposition such as vacuum vapor deposition, sputtering, ion plating, etc., or chemical vapor deposition such as thermal CVD, plasma CVD, optical CVD, etc.

In the case of vapor deposition, an inorganic material is vaporized by heating, and deposited onto the substrate in vacuum to form an inorganic layer. An inorganic-material-vaporizing method is not particularly restricted, but may be a method of using an electric heater, a method of ejecting electron beams from an E-type electron gun, a method of ejecting large-current electron beams by hollow cathode discharge, a laser abrasion method using laser pulse, etc. The substrate is preferably set with its to-be-coated surface opposing the inorganic material to be vaporized, and rotated during vapor deposition. With the vapor deposition time, the heating temperature, etc. properly set, a layer having the desired thickness can be formed.

The present invention will be explained in further detail by Examples below without intention of restricting the present invention thereto.

EXAMPLE 1

40 g of hydrochloric acid (0.01 N) having pH of 2 was mixed with 1.21 g (0.088 mol/L) of n-hexadecyltrimethyl ammonium chloride (available from Kanto Chemical Co. Ltd.), and 1.10 g (0.002 mol/L) of a block copolymer $HO(C_2H_4O)_{106}$—$(C_3H_6O)_{70}$—$(C_2H_4O)_{106}H$ ("Pluronic F127" available from Sigma-Aldrich), stirred at 23° C. for 1 hour, mixed with 4.00 g (0.45 mol/L) of tetraethoxysilane (available from Kanto Chemical Co. Ltd.), stirred at 23° C. for 3 hours, mixed with 3.94 g (1.51 mol/L) of a 28-%-by-mass ammonia water to adjust the pH to 11, and then stirred at 23° C. for 0.5 hours. The resultant solution of a surfactant-mesoporous silica nano-particles composite was spin-coated on a flat plate (diameter: 30 mm) of BK7 glass having a refractive index of 1.518, dried at 80° C. for 0.5 hours, and then baked at 600° C. for 3 hours. The characteristics of the resultant anti-reflection coating are shown in Table 1. Used in the measurement of a refractive index and a physical thickness was a lens reflectance meter (USPM-RU available from Olympus Corporation).

EXAMPLE 2

A mesoporous silica coating was formed in the same manner as in Example 1, except for using a flat plate (diameter: 30 mm) of LAK14 glass having a refractive index of 1.700 as a substrate. The characteristics of the resultant anti-reflection coating are shown in Table 1.

EXAMPLE 3

Using an electron beam vapor deposition apparatus, a silicon oxide layer (refractive index: 1.469) having a physical thickness of 95 nm (optical thickness: 130 nm) was formed on the above flat LAK14 glass plate (refractive index: 1.700) by vacuum vapor deposition. A solution of a surfactant-mesoporous silica nano-particles composite was prepared in the same manner as in Example 1 except for changing the amount of the above block copolymer to 3.22 g (0.006 mol/L). A mesoporous silica coating was formed on the above dense silicon oxide layer in the same manner as in Example 1 except for using this solution. The layer structure and characteristics of the resultant anti-reflection coating are shown in Table 1.

EXAMPLE 4

Using the above apparatus, a dense, multilayer coating having the structure shown in Table 1 was formed on the above flat LAK14 glass plate (refractive index: 1.700) by vacuum vapor deposition. A mesoporous silica coating was formed on the dense, multilayer coating in the same manner as in Example 1. The characteristics of the resultant anti-reflection coating are shown in Table 1.

EXAMPLE 5

A mesoporous silica coating was formed on the above flat BK7 glass plate (refractive index: 1.518) in the same manner as in Example 1 except for changing the physical thickness to 77 nm. The characteristics of the resultant anti-reflection coating are shown in Table 1. The mesoporous silica nano-particles forming this layer had an average diameter of 29 nm. The average diameter of the mesoporous silica nano-particles was measured by a dynamic light-scattering method using a dynamic light-scattering particle size distribution meter (LB-550 available from Horiba, Ltd.).

EXAMPLE 6

A solution of a surfactant-mesoporous silica nano-particles composite was prepared in the same manner as in Example 1 except for changing the amount of the above block copolymer to 3.22 g (0.006 mol/L). A mesoporous silica coating was formed on the above flat BK7 glass plate (refractive index: 1.518) in the same manner as in Example 1 except for using this solution. The characteristics of the resultant anti-reflection coating are shown in Table 1. The average diameter of the mesoporous silica nano-particles forming this layer was 25 nm.

EXAMPLE 7

A solution of a surfactant-mesoporous silica nano-particles composite was prepared in the same manner as in Example 1 except for changing the concentration of the above block copolymer to 0.004 mol/L. A mesoporous silica coating was formed on the above flat BK7 glass plate (refractive index: 1.518) in the same manner as in Example 1 except for using this solution. The characteristics of the resultant anti-reflection coating are shown in Table 1. The average diameter of the mesoporous silica nano-particles forming this layer was 28 nm.

EXAMPLE 8

A solution of a surfactant-mesoporous silica nano-particles composite was prepared in the same manner as in Example 1 except for changing the concentration of the above block copolymer to 0.008 mol/L. A mesoporous silica coating was formed on the above flat BK7 glass plate (refractive index: 1.518) in the same manner as in Example 1 except for using this solution. The characteristics of the resultant anti-reflection coating are shown in Table 1. The average diameter of the mesoporous silica nano-particles forming this layer was 25 nm.

COMPARATIVE EXAMPLE 1

Using the above apparatus, an anti-reflection coating of magnesium fluoride (refractive index: 1.388) having a physical thickness of 100 nm (optical thickness: 139 nm) was formed on the above flat BK7 glass plate (refractive index: 1.518) by vacuum vapor deposition. The characteristics of the anti-reflection coating are shown in Table 1.

COMPARATIVE EXAMPLE 2

Using the above apparatus, an anti-reflection coating of magnesium fluoride (refractive index: 1.388) having a physical thickness of 99 nm (optical thickness: 137 nm) was formed on the above flat LAK14 glass plate (refractive index: 1.700) by vacuum vapor deposition. The characteristics of the anti-reflection coating are shown in Table 1.

COMPARATIVE EXAMPLE 3

Using the above apparatus, a dense, multilayer anti-reflection coating having the structure shown in Table 1 was formed on the above flat BK7 glass plate (refractive index: 1.158) by vacuum vapor deposition. The layer structure and characteristics of the anti-reflection coating are shown in Table 1.

COMPARATIVE EXAMPLE 4

Using the above apparatus, a dense, multilayer anti-reflection coating having the structure shown in Table 1 was formed on the above flat LAK14 glass plate (refractive index: 1.700) by vacuum vapor deposition. The layer structure and characteristics of the anti-reflection coating are shown in Table 1.

COMPARATIVE EXAMPLE 5

An anti-reflection coating comprising a $MgF_2$ layer and a porous silica aerogel layer was formed on the above flat BK7 glass plate in the same manner as in Example 1 of JP 2006-215542 A. The layer structure and characteristics of the anti-reflection coating are shown in Table 1.

7-10. The anti-reflection coatings of Examples 1-4 had spectral reflectance of substantially 2% or less to light at an incident angle of 0°. On the other hand, the anti-reflection coatings of Comparative Examples 1-4 comprising only dense coatings had poorer spectral reflectance than that of the anti-reflection coatings of Examples 3 and 4 each comprising one or more dense coatings and a mesoporous silica layer. Because an anti-reflection coating was not formed in Comparative Examples 6 and 7, their spectral reflectance was evidently poorer than that of Examples 1-4 each having an anti-reflection coating.

(2) Evaluation of Scratch Resistance, Adhesion, Solvent Resistance and Moisture Resistance The scratch resistance, adhesion, solvent resistance and moisture resistance of the anti-reflection coatings of Examples 1, 2 and 5 and Comparative Examples 1-5 were evaluated by the following methods. The above properties

TABLE 1

| No. | Material of Substrate | Layer Structure | Anti-Reflection Coating | | | |
|---|---|---|---|---|---|---|
| | | | Porosity (%) | Refractive Index | Physical Thickness (nm) | Optical Thickness (nm) |
| Example 1 | BK7[1] | MSC[2] | 43.7 | 1.248 | 105 | 132 |
| Example 2 | LAK14[3] | MSC | 43.3 | 1.250 | 107 | 134 |
| Example 3 | LAK14 | First Layer: $SiO_2$ | — | 1.469 | 88 | 130 |
| | | Second Layer: MSC | 64.5 | 1.153 | 114 | 131 |
| Example 4 | LAK14 | First Layer: $TiO_2$ | — | 2.347 | 11 | 25 |
| | | Second Layer: $SiO_2$ | — | 1.469 | 43 | 63 |
| | | Third Layer: $TiO_2$ | — | 2.347 | 18 | 42 |
| | | Fourth Layer: $SiO_2$ | — | 1.469 | 63 | 93 |
| | | Fifth Layer: $TiO_2$ | — | 2.347 | 10 | 23 |
| | | Sixth Layer: MSC | 43.3 | 1.250 | 126 | 158 |
| Example 5 | BK7 | MSC | 43.7 | 1.248 | 77 | 96 |
| Example 6 | BK7 | MSC | 65.2 | 1.150 | 160 | 184 |
| Example 7 | BK7 | MSC | 58.0 | 1.182 | 101 | 119 |
| Example 8 | BK7 | MSC | 65.8 | 1.147 | 243 | 279 |
| Comparative Example 1 | BK7 | $MgF_2$ Layer | — | 1.388 | 100 | 139 |
| Comparative Example 2 | LAK14 | $MgF_2$ Layer | — | 1.388 | 99 | 137 |
| Comparative Example 3 | BK7 | First Layer: $TiO_2$ | — | 2.347 | 13 | 30 |
| | | Second Layer: $SiO_2$ | — | 1.469 | 35 | 51 |
| | | Third Layer: $TiO_2$ | — | 2.347 | 46 | 108 |
| | | Fourth Layer: $SiO_2$ | — | 1.469 | 14 | 21 |
| | | Fifth Layer: $TiO_2$ | — | 2.347 | 37 | 87 |
| | | Sixth Layer: $SiO_2$ | — | 1.469 | 90 | 132 |
| Comparative Example 4 | LAK14 | First Layer: $TiO_2$ | — | 2.347 | 14 | 34 |
| | | Second Layer: $SiO_2$ | — | 1.469 | 27 | 40 |
| | | Third Layer: $TiO_2$ | — | 2.347 | 47 | 111 |
| | | Fourth Layer: $SiO_2$ | — | 1.469 | 14 | 21 |
| | | Fifth Layer: $TiO_2$ | — | 2.347 | 35 | 82 |
| | | Sixth Layer: $SiO_2$ | — | 1.469 | 90 | 133 |
| Comparative Example 5 | BK7 | First Layer: $MgF_2$ | — | 1.388 | 90 | 125 |
| | | Second Layer: PSA[4] | 54 | 1.200 | 106 | 127 |

Note:
[1]BK7 had a refractive index of 1.518.
[2]MSC represents a mesoporous silica coating.
[3]LAK14 had a refractive index of 1.700.
[4]PSA represents a porous silica aerogel.

(1) Measurement of Spectral Reflectance

With respect to the anti-reflection coatings of Examples 1-4 and Comparative Examples 1-5, the spectral reflectance of light in a wavelength range of 380-780 nm at an incident angle of 0° was measured using a spectrophotometer (U4000 available from Hitachi Ltd.) The spectral reflectance was also measured in Comparative Example 6 having only the above flat BK7 glass plate (refractive index: 1.518), and Comparative Example 7 having only the above flat LAK14 glass plate (refractive index: 1.700). The results are shown in FIGS.

were also evaluated on the above flat BK7 glass plate (refractive index: 1.518) as Comparative Example 6. The results are shown in Table 2.

(a) Scratch Resistance

Each anti-reflection coating was rubbed with a nonwoven fabric (SPICK lens cleaning wiper available from Ozu Corporation) 10 times at a pressure of 1 $kgf/cm^2$ and a speed of 120 times/minute, and the rubbed surface was observed to evaluate scratch resistance according to the following standards:

Excellent: The anti-reflection coating was not damaged at all.
Good: The anti-reflection coating was slightly damaged, but did not peel.
Poor: The anti-reflection coating peeled off.
(b) Adhesion
A cellophane tape was attached to a region of 1 cm×1 cm on each anti-reflection coating, and then peeled by pulling in a direction of 45° to evaluate the adhesion of the anti-reflection coating according to the following standard:
Excellent: The anti-reflection coating did not peel at all.
Poor: The anti-reflection coating partially or totally peeled.
(c) Solvent Resistance
Each anti-reflection coating was rubbed with the above nonwoven fabric soaked with ethanol 10 times at a pressure of 1 kgf/cm² and a speed of 120 times/minute, and the rubbed surface was observed to evaluate the solvent resistance of the anti-reflection coating according to the following standard:
Excellent: The anti-reflection coating was not damaged at all.
Good: The anti-reflection coating was slightly damaged, but did not peel.
Poor: The anti-reflection coating peeled off.
(d) Moisture Resistance
Each anti-reflection coating was subjected to 60° C. and a relative humidity of 95% for 72 hours, and its spectral reflectance was measured in the same manner as above to evaluate the moisture resistance of the anti-reflection coating according to the following standard:
Excellent: The appearance and spectral reflectance of the anti-reflection coating did not change at all.
Good: The appearance of the anti-reflection coating did not change, though the spectral reflectance changed.
Poor: The anti-reflection coating was roughened, and its spectral reflectance changed.

TABLE 2

| No. | Scratch Resistance | Adhesion | Solvent Resistance | Moisture Resistance |
|---|---|---|---|---|
| Example 1 | Excellent | Excellent | Excellent | Excellent |
| Example 2 | Excellent | Excellent | Excellent | Excellent |
| Example 4 | Excellent | Excellent | Excellent | Excellent |
| Comparative Example 1 | Excellent | Excellent | Excellent | Excellent |
| Comparative Example 2 | Excellent | Excellent | Excellent | Excellent |
| Comparative Example 3 | Excellent | Excellent | Excellent | Excellent |
| Comparative Example 4 | Excellent | Excellent | Excellent | Excellent |
| Comparative Example 5 | Poor | Poor | Poor | Good |
| Comparative Example 6 | Excellent | Excellent | Excellent | Excellent |

It is clear from Table 2 that the anti-reflection coatings of Examples 1, 2 and 4 had excellent scratch resistance, adhesion, solvent resistance and moisture resistance. The anti-reflection coating of Comparative Example 5 comprising a porous silica aerogel layer had poorer scratch resistance, adhesion, solvent resistance and moisture resistance than those of the anti-reflection coatings of Examples 1, 2 and 4.

(3) Measurement of Hardness
Using a micro-hardness meter comprising a triangular pyramid indenter ("ENT-1100a" available from Elionix Inc.), the Martens hardness (GPa) of each anti-reflection coating of Examples 5 and 6 was measured at 3 types of indentation loads of 10 mgf, 50 mgf and 100 mgf according to ISO14577-1: 2002. The results are shown in Table 3.

TABLE 3

| Martens Hardness (GPa) at Indentation Load of | No. | |
|---|---|---|
| | Example 5 | Example 6 |
| 10 mgf | 2.25 | 1.24 |
| 50 mgf | 3.54 | 2.79 |
| 100 mgf | 5.03 | 4.18 |

It is clear from Table 3 that both anti-reflection coatings of Examples 5 and 6 had practically acceptable hardness.

(4) Measurement of Pore Diameter Distribution
Using an automatic apparatus for measuring a specific surface area and a pore diameter distribution ("TriStar 3000" available from Shimadzu Corporation), a curve of the isothermal desorption of nitrogen was obtained on each anti-reflection coating of Examples 1, 7 and 8, and analyzed by a BJH method to obtain a pore diameter distribution [log (differential pore volume distribution)]. The results are shown in FIG. 11.

Figure 11:
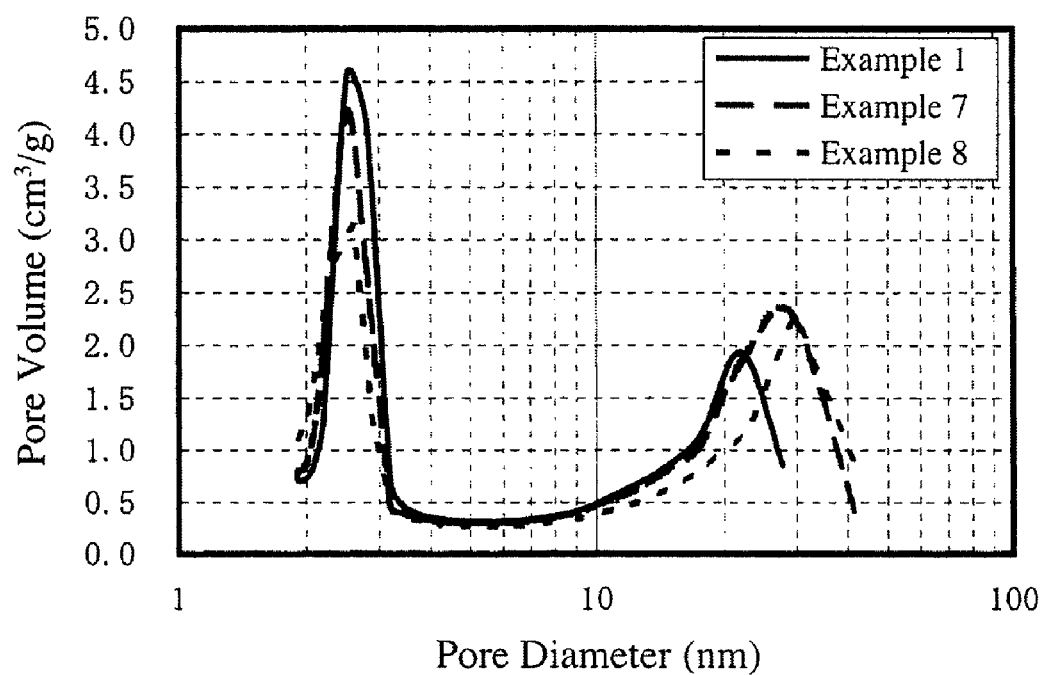
FIG. 11 is a graph showing the pore diameter distribution curves of the anti-reflection coatings of Examples 1, 7 and 8.

As is clear from FIG. 11, any anti-reflection coating of Examples 1, 7 and 8 had a pore diameter distribution curve having two peaks; pores in particles having diameters in a range of 2-10 nm, and pores among particles having diameters in a range of 5-200 nm. In the anti-reflection coating of Example 1, $D_A$, $D_B$, $D_C$ and $D_D$ in FIG. 3 were 2.1 nm, 3.2 nm, 14.4 nm, and 27.7 nm, respectively. By analysis according to the BJH method, the total volume of pores having diameters in a range of 2.1-3.2 nm was determined as a total volume $V_1$ of pores in particles, and the total volume of pores having diameters in a range of 14.4-27.7 nm was determined as a total volume $V_2$ of pores among particles. As a result, a ratio $V_1/V_2$ was 1/1.3. With respect to the anti-reflection coating of Example 9, the ratio $V_1/V_2$ was 1/1.7, when calculated in the same manner as above except that $D_A$ was 2.0 nm, $D_B$ was 3.2 nm, $D_C$ was 14.8 nm, and $D_D$ was 41.5 nm. With respect to the anti-reflection coating of Example 10, the ratio $V_1/V_2$ was 1/1.9, when calculated in the same manner as above except that $D_A$ was 1.9 nm, $D_B$ was 3.2 nm, $D_C$ was 22.6 nm, and $D_D$ was 41.4 nm.

EFFECTS OF THE INVENTION

The anti-reflection coating of the present invention has a proper refractive index, and excellent anti-reflection performance to light rays in a wide wavelength range, as well as excellent scratch resistance, adhesion to a substrate, mechanical strength and moisture resistance. A lens having the anti-reflection coating of the present invention with such excellent anti-reflection characteristics suffers much less difference in the amount and color of transmitted light between a center portion and a peripheral portion, with ghost, etc. due to reflected light in the peripheral portion extremely reduced. The use of an optical member having such excellent characteristics for cameras, endoscopes, binoculars, projectors, etc. can provide images with extremely improved quality. Further, the anti-reflection coating of the present invention enjoys a low production cost and a high yield.

The present disclosure relates to subject matter contained in Japanese Patent Application No. 2008-052607 filed on Mar. 3, 2008, which is expressly incorporated herein by reference in its entirety.

What is claimed is:

1. An anti-reflection coating comprising a mesoporous silica coating having bonded mesoporous silica nano-particles formed on a substrate, said mesoporous silica coating having a refractive index of more than 1.10 and 1.35 or less.

2. The anti-reflection coating according to claim 1, wherein said mesoporous silica nano-particles have an average diameter of 200 nm or less.

3. The anti-reflection coating according to claim 1, wherein said mesoporous silica nano-particles have a porous structure in which meso-pores are arranged hexagonally.

4. The anti-reflection coating according to claim 1, wherein said mesoporous silica coating has a structure in which a pore diameter distribution curve determined by a nitrogen adsorption method has two peaks.

5. The anti-reflection coating according to claim 4, wherein the pore diameter distribution curve of said mesoporous silica coating has a peak due to the diameters of pores in a range of 2-10 nm, and a peak due to the diameters of pores among particles in a range of 5-200 nm.

6. The anti-reflection coating according to claim 5, wherein a volume ratio of pores in said particles to pores among said particles is 1/2-1/1.

7. An anti-reflection coating comprising a dense coating and a mesoporous silica coating formed in this order on a substrate, said mesoporous silica coating having bonded mesoporous silica nano-particles and having a refractive index of more than 1.10 and 1.35 or less.

8. The anti-reflection coating according to claim 7, wherein said dense coating is a single-layer, and wherein a refractive index decreases from said substrate to said mesoporous silica coating in this order.

9. The anti-reflection coating according to claim 7, wherein said mesoporous silica nano-particles have an average diameter of 200 nm or less.

10. The anti-reflection coating according to claim 7, wherein said mesoporous silica nano-particles have a porous structure in which meso-pores are arranged hexagonally.

11. The anti-reflection coating according to claim 7, wherein said mesoporous silica coating has a structure in which a pore diameter distribution curve determined by a nitrogen adsorption method has two peaks.

12. The anti-reflection coating according to claim 11, wherein the pore diameter distribution curve of said mesoporous silica coating has a peak due to the diameters of pores in particles in a range of 2-10 nm, and a peak due to the diameters of pores among particles in a range of 5-200 nm.

13. The anti-reflection coating according to claim 12, wherein a volume ratio of pores in said particles to pores among said particles is 1/2-1/1.

14. The anti-reflection coating according to claim 7, wherein said dense coating is a multilayer comprising pluralities of layers having different refractive indices.

* * * * *